US009884976B1

(12) United States Patent
Parker et al.

(10) Patent No.: US 9,884,976 B1
(45) Date of Patent: Feb. 6, 2018

(54) COATING COMPOSITIONS AND METHODS, AND ARTICLES COATED WITH SAME

(75) Inventors: Mark A Parker, Evansville, IN (US); David Keith Cannon, Evansville, IN (US)

(73) Assignee: Red Spot Paint & Varnish Co., Inc., Evansville, IN (US)

(*) Notice: Subject to any disclaimer, the term of this patent is extended or adjusted under 35 U.S.C. 154(b) by 1481 days.

(21) Appl. No.: 11/208,020

(22) Filed: Aug. 19, 2005

Related U.S. Application Data

(60) Provisional application No. 60/602,939, filed on Aug. 19, 2004.

(51) Int. Cl.
| | | |
|---|---|---|
| *C09D 119/00* | (2006.01) | |
| *B32B 25/16* | (2006.01) | |
| *C09D 5/24* | (2006.01) | |
| *B32B 27/36* | (2006.01) | |
| *B32B 27/34* | (2006.01) | |
| *C09D 175/04* | (2006.01) | |
| *B32B 27/30* | (2006.01) | |
| *C09D 17/00* | (2006.01) | |

(52) U.S. Cl.
CPC .......... *C09D 119/006* (2013.01); *B32B 25/16* (2013.01); *B32B 27/308* (2013.01); *B32B 27/34* (2013.01); *B32B 27/36* (2013.01); *C09D 5/24* (2013.01); *C09D 17/005* (2013.01); *C09D 175/04* (2013.01); *B32B 2260/021* (2013.01); *B32B 2260/046* (2013.01); *B32B 2605/08* (2013.01)

(58) Field of Classification Search
CPC .... C09D 119/006; C09D 17/005; C09D 5/24; C09D 175/04; B32B 25/16; B32B 27/34; B32B 27/36; B32B 27/308; B32B 2260/021; B32B 2260/046; B32B 2605/08
USPC ......................................................... 428/521
See application file for complete search history.

(56) References Cited

U.S. PATENT DOCUMENTS

| | | | |
|---|---|---|---|
| 3,427,366 A * | 2/1969 | Ryan et al. ................... 525/126 |
| 3,466,259 A | 9/1969 | Jernigan |
| 3,548,030 A | 12/1970 | Jernigan |
| 3,577,478 A | 5/1971 | Thorpe |
| 3,838,093 A * | 9/1974 | Owston ........................ 524/317 |
| 3,962,498 A * | 6/1976 | Owston ........................ 427/322 |
| 4,039,593 A * | 8/1977 | Kamienski et al. .......... 568/857 |
| 4,282,285 A | 8/1981 | Mohiuddin |
| 4,289,811 A | 9/1981 | Shelley, Jr. |
| 4,368,222 A | 1/1983 | Blegen et al. |
| 4,474,845 A | 10/1984 | Hagerman et al. |
| 4,636,546 A | 1/1987 | Chao |
| 4,656,217 A | 4/1987 | Sugiura et al. |
| 4,704,446 A * | 11/1987 | Goel ............................... 528/78 |
| 4,737,403 A | 4/1988 | Simpson et al. |
| 4,874,818 A | 10/1989 | Yamamoto et al. |
| 5,021,297 A | 6/1991 | Rhue et al. |
| 5,043,372 A * | 8/1991 | MacLeay ...................... 524/103 |
| 5,064,896 A * | 11/1991 | Martin .......................... 524/731 |
| 5,077,349 A * | 12/1991 | Fehlbier et al. .............. 524/705 |
| 5,221,707 A * | 6/1993 | Chihara ................. C08G 18/10 524/267 |
| 5,284,900 A | 2/1994 | Izubayashi et al. |
| 5,389,443 A * | 2/1995 | Banerjee et al. ............. 428/413 |
| 5,498,783 A * | 3/1996 | Foukes et al. ................ 525/165 |
| 5,516,551 A | 5/1996 | Anderson et al. |
| 5,599,630 A | 3/1997 | Smith et al. |
| 5,611,881 A | 3/1997 | Kimura et al. |
| 5,624,735 A | 4/1997 | Anderson et al. |
| 5,674,565 A | 10/1997 | Kausch et al. |
| 5,688,598 A * | 11/1997 | Keck et al. ................... 428/458 |
| 5,700,312 A | 12/1997 | Fausnight et al. |
| 5,863,646 A * | 1/1999 | Verardi et al. ............... 428/323 |
| 5,885,662 A | 3/1999 | Gardner, Jr. |
| 5,993,906 A | 11/1999 | Smith et al. |
| 6,005,668 A | 12/1999 | Held, III et al. |
| 6,060,560 A * | 5/2000 | St. Clair ........................ 525/124 |
| 6,146,706 A * | 11/2000 | Verardi et al. ............. 427/393.5 |
| 6,166,150 A | 12/2000 | Wilke et al. |
| 6,203,913 B1 * | 3/2001 | Kondos ................ C09D 161/20 428/423.1 |
| RE37,386 E * | 9/2001 | Melby et al. ................... 528/60 |
| 6,455,147 B1 | 9/2002 | Mizuno et al. |
| 6,515,042 B2 | 2/2003 | Kriessmann et al. |
| 6,541,076 B2 | 4/2003 | Dunkle |
| 6,541,114 B2 | 4/2003 | Katou et al. |
| 6,579,932 B1 | 6/2003 | Schipper et al. |
| 6,759,466 B2 | 7/2004 | Steinhausler et al. |
| 6,784,222 B2 | 8/2004 | Zychowski et al. |
| 6,835,759 B2 | 12/2004 | Bradford et al. |
| 6,878,782 B2 | 4/2005 | Merfeld et al. |
| 8,986,593 B2 | 3/2015 | Shane |
| 2002/0086115 A1 | 7/2002 | Lamers et al. |
| 2005/0072335 A1* | 4/2005 | Zhang et al. ................. 106/285 |

FOREIGN PATENT DOCUMENTS

| | | |
|---|---|---|
| CA | 2286855 | 3/2008 |
| CA | 1140721 | 8/2008 |
| JP | 54086526 | 7/1979 |
| JP | 2001138355 | 5/2001 |
| JP | 2001200129 | 7/2001 |

\* cited by examiner

*Primary Examiner* — Callie E Shosho
*Assistant Examiner* — John D Freeman
(74) *Attorney, Agent, or Firm* — King & Partners, PLC

(57) ABSTRACT

Described are sealing primer compositions that can be used to reduce paint defects such as pops or vapor boil on painted plastic substrates, as well as related methods for sealing plastic substrates, and sealed plastic substrates. Sealing primer compositions of the invention include a functionalized polydiene polymer such as a hydroxylated or other functional-group-containing polybutadiene polymer.

15 Claims, No Drawings

COATING COMPOSITIONS AND METHODS, AND ARTICLES COATED WITH SAME

REFERENCE TO RELATED APPLICATION

The present application claims the benefit of U.S. Provisional Patent Application No. 60/602,939 filed Aug. 19, 2004, which is hereby incorporated by reference herein in its entirety.

BACKGROUND

The present invention relates generally to coated substrates and coating materials therefor, and in one particular aspect to fiber-reinforced plastic substrates, such as automotive body panels formed with a sheet molding compound (SMC), that include a sealing primer coating.

As further background, plastics are becoming increasingly important in the construction of automobiles, trucks, off road vehicles, and other products. The materials most commonly used are resins, such as polyamides, polyesters, and urethanes, which are often reinforced with fibers, usually glass fibers.

In many instances, finish coating(s) used on fiber-reinforced plastic substrates such as SMC automotive body panels are cured or otherwise processed at elevated temperatures. Use of such elevated temperatures on the SMC substrates can lead to the evolution of gases from the substrate due to entrapped air and/or other volatile materials which ultimately cause defects in the finished surface such as blisters, craters, "pops" or "vapor boil".

Attempts to eliminate such defects have included the development of processes in which the substrate to be coated is preheated in order to drive off volatile materials prior to beginning the coating process. As well, SMC and other fiber-reinforced plastic materials have been formulated while attempting to minimize the entrapment of gas or volatile substances such as water in the plastic material, and sealing primer coatings have been developed in an attempt to seal the substrate to minimize or prevent the evolution of gases (including vapors) and thereby protect the applied finish coating.

Despite efforts in the area, needs remain for improved and alternative materials and methods to prevent the formation of defects in finish coatings applied to fiber-reinforced plastic substrates. The present invention is addressed to these needs.

SUMMARY OF THE INVENTION

One feature of the invention is the development of a coating composition that can be used as a sealing primer for plastic substrates and thereby substantially reduce the occurrence of surface defects, such as popping or vapor boil, by significantly decreasing or eliminating the release of gas or vapor (including but not limited to water vapor) from the substrate during subsequent coating operations that involve heating.

Accordingly, one embodiment of the invention provides a fiber-reinforced plastic product that includes a fiber-reinforced plastic substrate and a cured sealing primer coating on the fiber-reinforced plastic substrate. The cured coating includes a reaction product formed by curing a coating composition including a functional-group containing (i.e. functionalized) polydiene polymer, for example a functionalized polybutadiene polymer.

Another embodiment of the invention provides an automotive body panel product that includes a compression molded, fiber-reinforced plastic automotive body panel, and a cured primer coating on the compression molded, fiber-reinforced plastic automotive body panel. The cured primer coating includes the reaction product of a primer coating composition including a functional-group-containing polydiene polymer and an electrically-conductive pigment.

Another embodiment of the invention provides a coating composition useful as a sealing primer, comprising a functional-group-containing polydiene polymer and an electrically conducting pigment. In one form of the invention, the coating composition, when cured, is capable of forming a coating having a surface conductivity of at least about 100 Randsburg units.

Another embodiment of the invention provides a method for coating a fiber-reinforced plastic substrate. The method of the invention includes applying to a fiber-reinforced plastic substrate a curable sealing primer composition comprising a functional-group-containing polydiene polymer and an electrically conductive pigment; and, curing the sealing primer composition.

These and other embodiments, features and advantages of the invention will be apparent to those of ordinary skill in the art from the descriptions herein.

DETAILED DESCRIPTION

For the purposes of promoting an understanding of the principles of the invention, reference will now be made to certain embodiments thereof and specific language will be used to describe the same. It will nevertheless be understood that no limitation of the scope of the invention is thereby intended, and alterations and modifications in the described embodiments, and further applications of the principles of the invention as illustrated herein are contemplated as would normally occur to one skilled in the art to which the invention relates.

As described above, the present invention provides unique coating compositions, coated products, and coating methods. In certain aspects, the invention involves coating compositions that are useful as sealing primers for plastic parts, wherein the coating compositions incorporate a functionalized polydiene polymer, as well as related coated products and coating methods.

Plastic substrates which can be coated in accordance with the present invention include preformed plastic substrates such as the compression molded fiber glass-reinforced polyester type which are known in the art as sheet molding compounds (SMC). Such compositions are very well known in the art, and in general include a resin (often a polyester resin), fillers such as calcium carbonate, chopped glass fibers, release agents and a low profile additive that expands during curing. SMC materials are extensively described in the literature, including for example U.S. Pat. Nos. 3,577,478, 3,548,030 and 3,466,259. Typically, SMC is a thermoset malleable sheet composite molded from a prepreg including the above-noted ingredients. To produce the sheet, the resin and additive mixture is transferred from a metering device onto a moving film carrier. Chopped glass or carbon fibers drop onto the mixture and a second film carrier places another layer of resin mixture on top of the glass. Rollers compact the sheet, squeezing out trapped air and saturating the fibers with the resin mixture. Over the next few days, referred to as the maturation period, the sheet increases in viscosity. When the SMC is ready for molding, it is cut into smaller sheets. To form a part from the SMC, a charge pattern is assembled on a heated mold. The mold is closed and clamped, pressure is applied and the SMC flows to fill the mold cavity. After cure, the mold is opened and the part is removed.

SMC's strength, low cost to weight ratio, and design flexibility among other advantageous properties, allows its use in commercial products such as automotive body panels, recreational vehicle components, residential doors, and appliances.

Commercial SMC formulations and parts made therefrom include, for example, those available from Ashland Specialty Chemical Company as AROTRAN® Phase Epsilong 50411 (Class A resin), AROTRAN® Phase Delta 50425 (Class A low moisture resin), ROTECH 2000, 2002, 2005 (structural resins), and EKADURE (structural resin); those available from AOC as Atryl® S342 resin, Atryl® S903 resin, Atryl® T764 resin; those available from ThyssenKrup budd including BD 4077, BD 850, BD 850A1, and BD 971; and those available from Meridian Automotive Systems as SLI323IF; those available from Menzolit LTD as 47-2920; 47-1180; 47-5320; and 47-2055. These or other existing or developed SMC formulations can be used in the invention, including both conventional SMC formulations as well as low density (e.g. containing spherical glass or other reinforcement materials) and/or those known in the art as low moisture SMC formulations.

Plastic substrates to be coated in accordance with the invention may also be formed from bulk molding compound (BMC), which is chemically similar to SMC, with the preferred primary resins consisting of unsaturated polyesters and/or unsaturated vinyl esters. The method of producing a molded article differentiates the two. Unlike SMC, where compression molding is the preferred method, BMC products are produced by injection molding. Examples of commercially available BMC products include those available from Bulk Molding Compounds, Inc. as BMCI 310, BMCI 350, BMCI 605LS, and MBCI 1050; and those available from Menzolit LTD, including DMC 43-2201, DMC 43-1834, and DMC 43-1835.

Reaction Injection Molding (RIM) may also be used to form plastic substrates to be coated in accordance with the invention. RIM is a process for molding liquid chemical systems in which mixing of two to four components such as polyols and polyisocyanates in the proper chemical ratio is accomplished by a high-pressure impingement-type mixing head. The mixed material is delivered into a mold at low pressure, where it reacts to produce parts know in the industry as RIM parts. Commercial products include medical, electronic, and industrial enclosures. Examples of commercial RIM formulations include those available in the Bayflex series from Bayer, such as XGT-16.

Reinforced Reaction Injection Molding (RRIM) is the RIM process with reinforcement (typically chopped glass or carbon fibers, mica, wollastonite, or other additives) added to the liquid chemical systems to produce parts known in the industry as RRIM parts. This process is used most frequently to produce automotive exterior parts such as body panels, fascias, and side moldings. Examples of commercially available RRIM formulations include those available in the Bayflex series from Bayer, such as 190.

Plastic substrates in the invention may also be prepared by Structural Reaction Injection Molding (SRIM), which is the RIM process in which the liquid chemical system is injected into a mold containing preformed glass fiber mats where it permeates and surrounds the glass fiber mat to form the part. SRIM is often used in demanding applications where the part is subjected to heavy loads, such as automotive cargo boxes and inner tailgate and midgate panels. Examples of commercially available SRIM formulations include those in the Baydur series from Bayer, such as 425.

Partially crystalline polyamide resins suitable for injection molding produce molded parts that are extremely chemical and impact resistant. These may also be coated within the present invention. Additional performance properties can be achieved with reinforcing polymers such as polyphenylene ether that adds dimensional stability and heat resistance to the final part. Illustrative commercial products include automotive exterior vertical body panels, automotive wheel covers, automotive mirror housings, and exterior trim components. Examples of commercial partially crystalline polyamide resins reinforced with polyphenylene ether include those in the Noryl GTX series from GE, such as 964, 975, and 944. Examples of commercial partially crystalline polyamide resins reinforced with Acrylo-nitril Butadine Styrene include those in the Triax series from DuPont, such as DP3155 and TP3161.

Processes of the invention include the application of a sealing primer coating to the plastic substrate, optionally after preheating the substrate, e.g. to drive off amounts of gas or volatile components. In accordance with the invention, the primer coating composition will include a functionalized polydiene polymer. In certain embodiments, the composition will also include at least one additional component that is reactive with the functionalized polydiene polymer in a curing operation for the sealing primer coating.

Functionalized polydiene polymers include a characteristic polymer backbone formed at least in part from a diene monomer. Such polymers can be homopolymers or copolymers of conjugated diene monomers such as butadiene, isoprene, or other similar aliphatic diolefin compounds, and will typically have a relatively hydrophobic character. Functionalized polydiene polymers used in the invention will desirably be constituted at least 30% by weight from the diene monomer(s), more desirably at least 50% or more. Functionalized polydiene homopolymers are preferably utilized.

The functional groups on the functionalized polydiene polymers may, for example, include one or more of hydroxyl groups, vinyl groups, anhydride groups, epoxy groups, acrylate groups or other similar reactive groups. These may or may not occur as end-terminal groups, and combinations of end-terminal and non-end terminal groups may also be present.

Functionalized polybutadiene polymers are preferred for use in the invention. These include, for example, hydroxylated polybutadiene polymers (e.g. having end-terminal hydroxyl groups), epoxidized polybutadiene polymers such as epoxidized, acrylated polybutadiene polymers, hydroxyl-terminated polybutadiene polymers, vinyl-terminated polybutadiene polymers, acrylate-terminated polybutadiene, and end-functional polybutadiene polymers which may be prepared by reacting the hydroxyl groups of a corresponding hydroxyl-terminated polymer with an appropriate reagent such as a carboxylic acid, an acid chloride, or an anhydride such as maleic anhydride. Suitable such polymers may be prepared in accordance with known methods, or they may be obtained commercially.

In this regard, commercially available hydroxyl functionalized polybutadiene resins include those in the Poly bd or Krasol series from Sartomer company, including Poly bd R-20LM, Poly bd R-45M, Poly bd R-45HTLO, Poly bd LF-1, Poly bd LF-2, Poly bd LF-3, Poly bd LF-5, Poly bd LF-6, Poly bd LF-7, Krasol HLBH-P 3000, Krasol LBH 2000, Krasol LBH 3000, Krasol LBH 5000, Krasol LBH 10000, Krasol LBH-P 2000, Krasol LBH-P 3000, Krasol LBH-P 5000, Krasol LBH-P 10000, Krasol LBH 2040; and those in the NISSO series from Mitsubishi International Corporation, including NISSO-PB G-1000, NISSO-PB G-2000, NISSO-PB G-3000, NISSO-PB GI-1000, NISSO-PB GI-2000, NISSO-PB GI-3000. Commercially available vinyl functionalized polybutadiene resins include Poly bd R45VT from Sartomer Company. Commercially available acrylate functionalized polybutadiene resins include those in the CN series from Sartomer Company, including CN-301, CN-302, CN-303, and CN-307. Commercially available epoxidized, hydroxyl functionalized polybutadiene resins include those in the Poly bd series from Sartomer Company, including Poly bd 600E, Poly bd 605E, and Poly bd 700E. Maleinized polybutadiene resins are also commercially available, including those in the Krasol or Ricon series of resins from Sartomer Company, including Krasol LBM-22, Krasol LBM-32, Ricon 130MA8, Ricon 130MA13, Ricon 130MA20, Ricon 131MA5, Ricon 131MA10, Ricon 131MA17, Ricon 131MA20, Ricon 184MA6, Ricon 100, Ricon 181, and Ricon 184.

Functionalized polybutadiene or other polydiene polymers used in the invention may have a number average molecular weight in the range of about 500 to about 5000, more typically in the range of about 1000 to about 3000.

Functionalized polybutadiene or other polydiene polymers that contain hydroxyl groups may, in certain embodiments of the invention, have hydroxyl values of about 0.5 to about 3 meq/g, and/or may have on average from about 1.5 to about 4 hydroxyl groups per molecule (i.e. a hydroxyl functionality of about 1.5 to about 4).

Functionalized polybutadiene or other polydiene polymers that contain epoxy groups may, in certain embodiment of the invention, have epoxy values of about 1.5 to about 5 meq/g, and/or may have on average from about 1.5 to about 4 epoxy groups per molecule (i.e. an epoxy functionality of about 1.5 to about 4). Epoxidized, hydroxy functionalized polybutadiene resins may be used, and may have these epoxy values and/or epoxy functionalities in combination with the hydroxy values and/or functionalities discussed above.

In certain embodiments of the invention, the coating composition can include a self-curing functionalized polydiene resin that has the capacity to react with itself to form a cured film. Alternatively or in addition, the coating compositions of the invention can include at least one additional component that is reactive with a functional group on the functionalized polydiene polymer, which will be referred to herein sometimes as a curing agent. As will be understood by those skilled in the art, the reactive moieties on this additional component(s) will depend in part upon the particular type(s) of functions present upon the functionalized polydiene polymer. Oftentimes, this additional component(s) will include at least two reactive groups that are capable of reacting with and crosslinking groups on the functionalized polydiene polymer.

In this regard, the additional component may include a conventional curing agent such as a (poly)carboxylic acid, a polyisocyanate, a blocked polyisocyanate, an anhydride, or an aminoplast resin. In certain embodiments, the curing agent is present at a level of about 1% by weight to about 40% by weight based upon the weight of the functionalized polydiene polymer (that is, calculated as weight of the curing agent divided by weight of the functionalized polydiene polymer), more typically about 20% by weight to about 30% by weight in the case of many curing agents.

Suitable isocyanates that can be used as curing agents to react with a functionalized polydiene polymer include any of the conventional aliphatic, cycloaliphatic, and aromatic isocyanates and polyisocyanates. Preferably, a polyisocyanate is used having on an average 2 to 6, preferably 2 to 4 and more preferably 3 isocyanate functionalities. Examples of suitable aliphatic or cycloaliphatic polyisocyanates include aliphatic or cycloaliphatic di-, tri- or tetra-isocyanates, which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, hexamethylene diisocyanate trimer, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane 4,4'-diisocyanate, meta-tetramethylxylylene diisocyanate, polyisocyanates having isocyanurate structural units such as the isocyanurate of hexamethylene diisocyanate and isocyanurate of isophorone diisocyanate, tris(6-isocyanatohexyl isocyanurate) trimer, the adduct of 2 molecules of a diisocyanate, such as hexamethylene diisocyanate, uretidiones of hexamethylene diisocyanate, uretidiones of isophorone diisocyanate or isophorone diisocyanate, and a diol such as ethylene glycol, the adduct of 3 molecules of hexamethylene diisocyanate and 1 molecule of water (available under the trademark Desmodur N-3300 from Bayer Corporation, Pittsburgh, Pa.). Polyisocyanate curing agents can, for example, be effectively used as curing agents in combination with hydroxyl-functionalized polydiene (e.g. polybutadiene) polymers.

Isocyanate functional adducts can also be used that are formed from an organic polyisocyanate and a polyol. One useful adduct is the reaction product of tetramethylxylidene diisocyanate and trimethylol propane and is sold under the tradename of Cythane 3160. Aromatic polyisocyanates can also be used, although aliphatic and cycloaliphatic polyisocyanates are generally preferred, since they have better weathering stability.

Polycarboxylic acids that may be used as curing agents to react with groups on the functionalized polydiene resins include low molecular weight polycarboxylic acids, for example, tetrahydrophthalic acid, hexahydrophthalic acid, phthalic acid, trimellitic acid, 1,5-naphthalenedicarboxylic acid, 2,3,6,7-naphthalenetetracarboxylic acid, etc.; and high molecular weight polycarboxylic acid, for example, polycarboxylic acid resin of vinyl-type, polyester type, etc. (usually having weight average molecular weight in the range of about 500 to about 80,000, particularly 2,000 to 20,000 and acid value in the range of 20 to 350 mgKOH/g, particularly 80 to 200 mgKOH/g). In certain embodiments of the invention, polycarboxylic acids can be used in combination with functionalized polydiene polymers including epoxy groups.

Anhydrides that may be used as curing agents to react with groups on the functionalized polydiene resin include bicyclo[2.2.1]hept-5-ene-2,3-dicarboxylic anhydride, methylbicyclo[2.2.1]hept-5-ene-2,3-dicarboxylic anhydride, bicyclo[2.2.1]hept-5-ene-2,3-dicarboxylic anhydride, phthalic anhydride, pyromellitic dianhydride, hexahydrophthalic anhydride, dodecenylsuccinic anhydride, dichloromaleic anhydride, chlorendic anhydride, tetrachlorophthalic anhydrides. In certain embodiments of the invention, anhydride curing agents can be used in combination with functionalized polydiene polymers having hydroxyl groups.

Aminoplast resins that may be used as curing agent include amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. In certain embodiments of the invention, aminoplast resins can be used in combination with functionalized polydiene polymers including hydroxyl groups and/or epoxy groups.

Boron trihalides can also be used as curing agents, with preference where the functionalized polybutadiene or other polydiene resin contains epoxy functional groups. Boron trihalides that may be used for these purposes include for example boron trichloride, boron trifluoride, a latent boron trifluoride chelate and/or a latent boron trichloride chelate.

Conventional initiator compounds can also be used as curing agents. Such initiator compounds include, for example, photopolymerization initiators whose photolysis products upon exposure to actinic radiation produce free radicals. These include for instance benzoin ether photopolymerization initiators such as benzoin alkyl ether; benzophenone photopolymerization initiators such as benzophenone, benzyl, and methylorthobenzoyl benzoate; acetophenone photopolymerization initiators such as benzyl methyl ketal, 2,2-diethoxyacetophenone, 2-hydroxy-2-methylpropiophenone, 4-isopropyl-2-hydroxy-2-methylpropiophenone, and 1,1-dichloroacetophenone; and thioxanthone photopolymerization initiators such as 2-chlorothioxanthone, 2-methylthioxanthone, and 2-isopropylthioxanthone; and bis-acylphosphine oxide. When included, a photopolymerization initiator will typically present at a level of about 0.1% to about 10%, based on the weight of the functionalized polydiene polymer, more typically about 2% to about 6%. In certain embodiments, photopolymerization initiators may be used in combination with functionalized polydiene polymers containing acrylate groups.

Illustrative peroxides that may serve as initiator compounds include for example diacyl peroxide, peroxy ester, hydro peroxide, dialkyl peroxide, ketone peroxide, peroxyketal, alkyl perester and percarbonates. Such peroxides, when used, are typically present at a level of about 0.1% to about 10%, based on the weight of the functionalized polydiene polymer, more typically about 1% to about 5%. In certain embodiments of the invention, peroxides may be effectively used in combination with functionalized polydiene polymers containing vinyl groups and/or acrylate groups.

Aromatic onium salts may be used as curing agents whereby the photolysis products upon exposure to actinic radiation produce Lewis acids. Suitable aromatic ononium salts which liberate a Lewis acid on exposure to actinic radiation include aromatic salts of groups VA and VIA elements of the Periodic Table, such as aromatic ammonium, arsonium, phosphonium, sulphonium, and selenonium tetrafluoroborates and hexafluorophosphates, and aromatic halogenonium salts such as aromatic iodonium tetrafluoroborates, hexafluorophosphates, hexafluoroantimonates, hexachloroantimonates, tetrachlorostannates, tetrachloroferrates, pentachlorobismuthates, hydrogen sulphates, nitrates, and hexafluoroarsenates. The preferred aromatic groups are phenacyl and phenyl groups. A specific example of such an onium salt is phenyl-p-octyloxyphenyl-iodonium hexafluoroantimonate.

Sealing primer coatings in automotive and other industries are often conductive to permit subsequent electrostatic application of paint to the parts when attached to metal parts. The composition of the present invention thus preferably includes at least one conductive pigment in an amount sufficient to impart conductivity to the coating film upon curing. Suitable conductive pigments for use herein include, for example, carbon black, graphite and mixtures of the two. Other pigments can also be included, for example to adjust the final color and hiding of the coating.

Examples of conductive carbon black that may be used in the invention include Conductex 975 Ultra (sold by Columbian Chemical Company, Atlanta, Ga.), Printex XE-2 (sold by Degussa, Frankfurt, Republic of Germany), and Black Pearls 2000 (sold by Cabot Corporation, Boston, Mass.). Compositions of the present invention generally include the carbon black pigment at a level of about 1 to 10% by weight, based on the binder (i.e. calculated as weight of the pigment divided by weight of the binder), more typically about 2 to 6%, when used. In this regard, as used herein, the term "binder" refers to the film-forming portion of the coating composition and generally includes the functional resins of the composition. Generally, catalysts, pigments, or chemical additives such as stabilizers are not considered part of the binder. In the present disclosure, the binder includes the functionalized polydiene polymer, any other functional resins present, e.g. as a curing agent, and all other film forming ingredients. In typical cases, the non-binder components other than pigments or solvents do not amount to more than about 10% by weight of the overall composition, and more typically not more than about 5% by weight of the overall composition.

Graphites that may be used may be either natural or synthetic, preferably synthetic. Examples of such graphites include M440, M450, M490, M850 and M890 (sold by Asbury Graphite Mills, Inc., Asbury, N.J.). Graphites may have a mean particle size of about 1 micron to about 15 micron, more typically in the range of about 3 micron to about 9 micron. Compositions of the present invention may include the graphite at a level of about 0 to 50% by weight, based on the binder, more typically between about 10 to 30%, when used.

In certain embodiments of the invention, the sealing primer coating composition will be effective to form a cured coating having a surface conductivity of at least about 100 Randsburg units, for example in the range of about 100 to about 350 Randsburg units, e.g. when coated to provide a cured film thickness of about 0.5 to about 5 mils, more typically about 1 to about 3 mils.

When included, suitable liquid carriers can serve as solvents, dispersants, diluents, suspending agents, and the like. Suitable liquid carrier materials include for instance water and/or organic solvents. Organic solvents may, for example, include an aliphatic or aromatic hydrocarbon such as petroleum naphtha or xylenes; ketones such as methyl amyl ketone, methyl isobutyl ketone, methyl ethyl ketone or acetone; alcohols such as methanol, isopropanol, or butanol; esters such as butyl acetate or hexyl acetate; glycol ethers such as ethylene glycol monethyl ether; glycol ether esters, such as propylene glycol monomethyl ether acetate and petroleum distillate cuts such as Aromatic 100, from Exxonmobil Chemical Co., Houston, Tex. The amount of organic solvent added depends upon the desired solids level as well as the desired amount of VOC of the composition. When used, the liquid carrier may for example be present at a level of about 1% by weight to about 95% by weight of the overall composition, and more typically this value is in the range of about 30% by weight to about 70% by weight.

In certain embodiments, the coating composition of the invention includes a catalyst, which can be present at a level of about 0.1 to 5%, more typically about 0.1 to 2%, by weight of the binder. Suitable catalysts include, for instance, organometallic catalysts such as organo tin catalysts, and acid catalysts. Thus, illustrative catalyst compounds include dibutyl tin dilaurate, dibutyl tin diacetate, dibutyl tin dioxide, dibutyl tin dioctoate, tin octoate, aluminum titanate, aluminum chelates, zirconium chelate and the like. Conventional acid catalysts include compounds such as aromatic sulfonic acids, for example dodecylbenzene sulfonic acid, para-toluenesulfonic acid and dinonylnaphthalene sulfonic acid, all of which are either unblocked or blocked with an amine, such as dimethyl oxazolidine, 2-amino-2-methyl-1-propanol, n,n-dimethylethanolamine, n,n-diisopropanolamine, or a combination thereof. Other acid catalysts that can be used are strong acids, such as phosphoric and phosphonic acids which may be unblocked or blocked with an amine. Combinations of two or more of the above catalysts can also be used.

Organic metal salts may also be utilized to catalyze polybutadiene resin. These catalysts, called metal driers, may be used either alone or in combination with the aforementioned organometallic catalysts. Metal driers serve to catalyze and accelerate the oxidation and/or polymerization of the polybutadiene carbon-carbon double bonds in the polymer backbone and/or those in pendant vinyl groups. Driers may be added for example in the range of 0.005 to 1% metal on resin solids to control the speed and uniformity of oxidative curing and the properties of the cured film. Metal driers that can be used to catalyze oxidative cure of coatings of the invention include those containing the following metals: Ba, Ca, Co, Fe, Li, Mg, Zn and Zr. Preferred metal driers include naphthenic acid and synthetic acid based driers containing Zr, Ca, Zn, and Co. These metal driers can be utilized either individually in the coating or in combination with two or more metal driers, depending on the desired final film property.

In certain embodiments, the coating composition of the invention includes a UV light stabilizer and/or a UV light absorber, each of which can be present at a level of about 0.01% by weight to about 3% by weight based upon the weight of the binder (resins). Suitable UV light absorbers include tris-aryl-1,3,5-triazine, a 2-hydroxyphenyl-2H-benzotriazole, a 2-hydroxybenzophenone, an ester of an unsubstituted benzoic acid, an acrylate, or an oxamide (oxanilide). Suitable UV light stabilizers include bis(2,2,6,6-tetramethylpiperid-4-yl) succinate, bis(2,2,6,6-tetramethylpiperid-4-yl) sebacate, bis(1,2,2,6,6-pentamethylpiperid-4-yl) sebacate, di(1,2,2,6,6-pentamethylpiperid-4-yl) butyl-(3,5-di-tert-butyl-4-hydroxybenzyl)malonate, bis(1-octyloxy-2,2,6,6-tetramethylpiperid-4-yl) sebacate, tetra(2,2,6,6-tetramethylpiperid-4-yl)butane-1,2,3,4-tetracarboxylate, tetra(1,2,2,6,6-pentamethylpiperid-4-yl)butane-1,2,3,4-tetracarboxylate, 2,2,4,4-tetramethyl-7-oxa-3,20-diaza-21-oxo-dispiro[5.1.11.2]heneicosane, and 8-acetyl-3-dodecyl-1,3,8-triaza-7,7,9,9-tetramethylspiro[4.5]decane-2,4-dione. Commercially available examples of these include SANDL-VOR 3050, 3052, 3055, 3056, 3058, PR-31 and PR-32 (Clariant Corp.); TINUVIN 079L, 123, 144, 292, 440L and 622LD (Ciba Specialty Chemicals); CHIMASORB 119 and 944 (Ciba Specialty Chemicals); and CYASORB UV-3346, UV 3529, UV-3853, UV-500 and UV-516 (Cytec Industries Inc.).

The sealing primer coating of the present invention may also include an amount of water scavenger such as trimethyl orthoacetate, triethyl orthoformate, tetrasilicate and the like. Rheology control agents such as microgel and/or hydrophobic silica may also be employed.

The composition may also include other conventional formulation additives such as toughening agents, and flow control agents. The incorporation of these and other additional additives will, of course, depend on the desired final properties of the coating composition.

Sealing primer compositions in accordance with the present invention may be designed as multiple-part (e.g. two-part) or one-part systems. As well, the sealing primer compositions may be adapted to cure by any suitable means, including for example thermal curing, curing upon exposure to radiation such as actinic or ionizing radiation, or combinations of these curing mechanisms.

The coating composition of the invention may be applied as a primer coating to the substrate in any suitable manner. These include, for example, brushing, dipping, flow coating, spraying, and the like. Spray application is most common. Typical spray techniques include, for example, air spraying and electrostatic spraying, with manual and/or automated methods being employed to coat the substrate.

The coating composition of the invention may be used as a pigmented or non-pigmented primer coating or sealer, and may be used alone or in combination with a secondary primer as known in the art, e.g. as a "wet on wet" application.

Upon or after application of the sealing primer composition to the substrate, the composition is caused to form a film on the substrate. When the sealing primer composition includes a volatile component such as a solvent, such can be driven from the composition during the formation of the film by any suitable technique such as by heating or air-drying for a suitable period of time. Typical drying times will be from about 0.5 to about 10 minutes in many operations, at temperatures of about 80° F. to about 250° F. In addition, more than one coating layer of the coating composition may be applied. Usually, between coats, the previously applied coating is flashed (dried by exposure to ambient conditions for about 0.5 to 10 minutes). The thickness of the primer or sealer coating is usually from about 0.5 to about 5 miles (12.7 to 127 microns), more typically about 1 to about 3 mils (25.4 to 76.2 microns). The sealing primer coating composition is then heated to cure all coating layers. In the curing operation, any solvent(s) present can be driven off and the film-forming materials are crosslinked. Heated curing operations are usually conducted at a temperature in the range of about 160° to about 350° F., but higher or lower temperatures may be used as needed in order to dry and cure the sealing primer coating.

In certain embodiments of the invention, the resulting primed substrate is coated with at least one additional coating layer atop the primer layer. For example, especially in the case of automotive parts finished at the OEM, the primed/sealed substrate may be coated with additional layers in a finishing operation, including for example a finishing primer, a pigmented basecoat and a clearcoat. Oftentimes, the basecoat and clearcoat are applied wet on wet, and then dried and cured together.

Illustrative finishing primer materials include, for example, acrylic or polyester powders, including for example those commercially available from PPG in the Envirocron series, such as PCV70105 powder; Siebert powder; urethane primers available from Dupont, including for example 148DN812 (water base), 148S41213 (water base), 148DN082 (water base), and M6518 (water base). These and other finishing primers are typically subjected to a bake during curing, for example at a temperature of about 150° F. to about 400° F., and in the case of powder primers typically at a higher temperature range exceeding about 200° F., e.g. about 200° F. to about 500° F., more usually about 300° F. to about 400° F.

Illustrative pigmented basecoat materials include, for example, urethane and melamine basecoat materials, including those available from BASF as E715AM117G, E174RM615G, E174KM610, and BC96885, as well as a variety of waterbase basecoat materials available from Dupont in the xxxSxxxxx series.

Illustrative clearcoat materials include, for example, urethane based clearcoat materials, including those available from Dupont in the RK-xxxx series, RKS 41985, RKS 41241; those available from BASF, such as E86CM200 and DL5300; and those available from PPG in the Deltron series.

For the purpose of promoting a further understanding of the present invention and its features and advantages, the following specific Examples are provided. It will be understood that these Examples are illustrative, and not limiting, of the invention.

Example 1

Preparation of Coating Composition

A. Preparation of Component A

A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 27 grams | UV Absorber** |
| 13 grams | Light Stabilizer*** |
| 0.53 grams | Dibutyl Tin Dilaurate |

*Poly bd R45HTLO
**Tinuvin 1130
***Tinuvin 292

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*Polybd R45HTLO
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 150.00 grams | Methyl Amyl Ketone |
| 138.13 grams | Polyisocyanate 1* |
| 287.17 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer Example 2

Preparation of Coating Composition

A. Preparation of Component A

A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 0.53 grams | Dibutyl Tin Dilaurate |

*NISSO G-1000

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*NISSO G-1000
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 199.5 grams | Methyl Amyl Ketone |
| 183.71 grams | Polyisocyanate 1* |
| 381.94 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer

Example 3

Preparation of Coating Composition

A. Preparation of Component A
A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 0.53 grams | Dibutyl Tin Dilaurate |

*NISSO G-2000

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*NISSO G-2000
**Printex XE2

B. Preparation of Component B
To prepare Component B, the following ingredients were added to a vessel in the listed order under agitation. A homogeneous mixture was produced by agitating for about 15 minutes after the final ingredient was added.

| | |
|---|---|
| 192.12 grams | Methyl Amyl Ketone |
| 176.91 grams | Polyisocyanate 1* |
| 367.80 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer

Example 4

Preparation of Coating Composition

A. Preparation of Component A
A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 0.53 grams | Dibutyl Tin Dilaurate |

*Nisso G-3000

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*NISSO G-3000
**Printex XE2

B. Preparation of Component B
To prepare Component B, the following ingredients were added to a vessel in the listed order under agitation. A homogeneous mixture was produced by agitating for about 15 minutes after the final ingredient was added.

| | |
|---|---|
| 118.30 grams | Methyl Amyl Ketone |
| 108.94 grams | Polyisocyanate 1* |
| 226.49 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer

Example 5

Preparation of Coating Composition

A. Preparation of Component A
A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 0.53 grams | Dibutyl Tin Dilaurate |

*LBH 3000

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*LBH 3000
**Printex XE2

B. Preparation of Component B
To prepare Component B, the following ingredients were added to a vessel in the listed order under agitation. A homogeneous mixture was produced by agitating for about 15 minutes after the final ingredient was added.

| | |
|---|---|
| 133.06 grams | Methyl Amyl Ketone |
| 122.53 grams | Polyisocyanate 1* |
| 254.75 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer

Example 6

Preparation of Coating Composition

A. Preparation of Component A

A clean stainless steel vessel equipped with a stirrer was charged with

| | |
|---|---|
| 1770 grams | Millbase A |
| 442 grams | Hydroxyl functional Polybutadiene* |
| 1230 grams | Methyl Amyl Ketone |
| 0.53 grams | Dibutyl Tin Dilaurate |

*Poly bd R45HTLO

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional Polybutadiene* |
| 54.87 grams | Conductive Carbon Black** |

*Poly bd R45HTLO
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 325.19 grams | Methyl Amyl Ketone |
| 922.01 grams | Anhydride functional Polybutadiene* |

*Ricon 130MA13

Example 7

Preparation of Coating Composition

A. Preparation of Component A

A clean stainless steel vessel equipped with a stirrer was charged with

| | |
|---|---|
| 1770 grams | Millbase A |
| 442 grams | Hydroxyl functional epoxidized Polybutadiene* |
| 1230 grams | Methyl Amyl Ketone |
| 0.53 grams | Dibutyl Tin Dilaurate |

*Poly bd 605E

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional epoxidized Polybutadiene* |
| 54.87 grams | Conductive Carbon Black** |

*Poly bd 605E
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 325.19 grams | Methyl Amyl Ketone |
| 922.01 grams | Anhydride functional Polybutadiene* |

*Ricon 130MA20

Example 8

Preparation of Coating Composition

A. Preparation of Component A

A clean stainless steel vessel equipped with a stirrer was charged with

| | |
|---|---|
| 1770 grams | Millbase A |
| 442 grams | Hydroxyl functional epoxidized Polybutadiene* |
| 1230 grams | Methyl Amyl Ketone |
| 0.53 grams | Dibutyl Tin Dilaurate |

*Poly bd 605E

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| Millbase A | |
|---|---|
| 854.91 grams | Methyl Amyl Ketone |
| 860.22 grams | Hydroxyl functional epoxidized Polybutadiene* |
| 54.87 grams | Conductive Carbon Black** |

*Polybd 605E
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 25.05 grams | Methyl Amyl Ketone |
| 71.03 grams | Boron Trifluoride* |

*Leepoxy B-1550

17

Example 9

Preparation of Coating Composition

A. Preparation of Component A

A clean stainless steel vessel equipped with a stirrer was charged with:

| | | |
|---|---|---|
| 1770 grams | Millbase A | |
| 442 grams | Hydroxyl functional Polybutadiene* | |
| 1230 grams | Methyl Amyl Ketone | |
| 25.11 grams | Zirconium/Calcium Drier** | |
| 15.07 grams | Cobalt Drier*** | |
| 0.53 grams | Dibutyl Tin Dilaurate | |

*Poly bd R45HTLO
**Nutra ADR
***Nutra UTD

The ingredients of Component A are added to the vessel in the listed order under agitation. A homogeneous mixture is produced by agitating for about 30 minutes after the final ingredient is added.

"Millbase A" was prepared in advance by adding the following ingredients to a clean stainless steel vessel under constant high speed agitation from a "saw-toothed" blade for approximately one hour.

| | |
|---|---|
| Millbase A | |
| 854.91 grams | Methyl Amyl Ketone |
| 860.22 grams | Hydroxyl functional Polybutadiene* |
| 54.87 grams | Conductive Carbon Black** |

*Polybd R45HTLO
**Printex XE2

B. Preparation of Component B

To prepare Component B, the following ingredients were added to a vessel in the listed order under agitation. A homogeneous mixture was produced by agitating for about 15 minutes after the final ingredient was added.

| | |
|---|---|
| 150.00 grams | Methyl Amyl Ketone |
| 138.13 grams | Polyisocyanate 1* |
| 287.17 grams | Polyisocyanate 2** |

*"Tolonate HDT" based on Tris(6-isocyanatohexyl isocyanurate) Trimer
**"Tolonate XIDT70SB" based on Hexamethylene Diisocyanate Trimer

Example 10

Production of Molded Article with Primer Applied

Component A and Component B were mixed together and spray applied to SMC panels at dry film coating thickness of 38 microns. Thereafter, the coated article was allowed to dry at ambient temperature (about 72 deg. F.) for 10 minutes followed by a bake of 300 deg. F. for 30 minutes.

The sealing primer-coated SMC panel was coated with a powder primer coating (Envirocron PCV70105, PPG Industries) and baked for 20 minutes at 340° F. to cure the powder primer coating. The panel was then tested for physical properties as identified in Table 1 below. In addition, similar samples were prepared, except using two commercially available melamine based one component primers (Red Spot Paint and Varnish).

TABLE 1

| Primer | Typical Specification | Example 1 | BP2349 | BP9471BC |
|---|---|---|---|---|
| Adhesion (9 × 9 crosshatch 3 mm spacing, carbide tip) | grade 1, <5% removed | grade 0, 0% removed | grade 0, 0% removed | grade 0, 0% removed |
| Water Soak @ 32 C./240 hrs | no change | no change | no change | no change |
| Post Water-Adhesion (9 × 9 Crosshatch, 3 mm spacing, Carbide tip) | grade 1, <5% removed | grade 0, 0% removed | grade 0, 0% removed | grade 0, 0% removed |
| Humidity @ 38 C. × 240 hrs | no change | no change | no change | no change |
| Post Humidity Adhesion, 9 × 9, 3 mm spacing, carbide tip | grade 1, <5% removed | grade 0, 0% removed | grade 0, 0% removed | grade 0, 0% removed |
| Chip Resistance @ −30 C. × 3 pints | 4B rating | 6A, pass | 7A, pass | 7A, pass |
| Environmental Cycling, 5" × 3 Cycles. 16 Hrs. @ 38° C. & 96% RH, 4 Hrs. @ −40° C., 4 Hrs. @ 90° C.) | no change | no change | no change | no change |
| Post Cycling Adhesion, 9 × 9 with 3 mm Spacing and Carbide Tip | grade 1, <5% removed | grade 0, 0% removed | grade 0, 0% removed | grade 0, 0% removed |
| Vapor & Gas Permeability | 0%, no visual defect | 0% | 100% | 100% |

Vapor and gas permeability as used herein represented a quantification of defects created in the test powder coat layer by chemical vapors and gases permeating from the substrate during the baking of the powder coat layer. Specifically, permeability was quantified as a percentage of panel surface area exhibiting defects caused by chemical vapor or gases during baking to cure the powder coat layer. These results demonstrate that the sealing primer composition of the present invention provides a significant improvement in vapor and gas permeability compared to the two commercial products tested.

Example 11

Preparations of Additional Coating Compositions

A. Preparation of Component A

A clean stainless steel vessel equipped with a stirrer is charged with the following:

| Ingredient | Amount | Preferred Amount |
|---|---|---|
| Functionalized Polybutadiene | 0.1-90% by wt of composition | 20-60% of composition |

| Ingredient | Amount | Preferred Amount |
|---|---|---|
| Solvent composition* | 1-95% by wt of | 30-70% by wt of |
| UV Absorber | 0.1-3% by wt of binder | 0.1-1% by wt of binder |
| Light Stabilizer | 0.1-3% by wt of binder | 0.1-1% by wt of binder |
| Catalyst | 0.1-5% by wt of binder | 0.1-2% by wt of binder |
| Conductive Carbon Black | 1-10% by wt of binder | 2-6% by wt. of binder |

*when combined with the weight of the solvent in Component B

The ingredients are stirred to produce a homogeneous mixture. If desired, a portion of the functionalized polybutadiene and solvent may be combined with the conductive carbon black to form a millbase, which may be added to the vessel along with appropriate amounts of the remaining components in the preparation of Component A.

B. Preparation of Component B

To prepare Component B, solvent and curing agent(s) are added and agitated in a vessel to produce a homogeneous mixture. The curing agent(s) is added to provide a level of 1-40% by weight of the functionalized polybutadiene polymer, more preferably about 20-30% by weight. The solvent is added in sufficient amount to provide a homogenous composition, and the solvent in Component A and the solvent in Component B combined remain in the range of 1-95% by weight of the overall composition, more preferably about 30-70% by weight.

Example 12

Production of Additional Molded Articles with Primer Applied

Component A and Component B from Example 11 are mixed together and spray applied to SMC panels at dry film coating thickness of about 30-40 microns. Thereafter, the coated article is allowed to dry at ambient temperature (about 72° F.) for about 10-20 minutes followed by a bake of about 300-400° F. for 20-60 minutes.

The sealing primer-coated SMC panel is coated with a urethane powder primer coating and baked for 15-30 minutes at 300-350° F. to cure the powder primer coating. Conventional basecoat/clearcoat systems can then be applied to the SMC panel.

While the invention has been illustrated and described in detail in the foregoing description, the same is to be considered as illustrative and not restrictive in character, it being understood that only certain embodiments have been shown and described and that all changes and modifications that come within the spirit of the invention are desired to be protected. In addition, all publications cited herein are hereby incorporated by reference in their entirety as if each had been individually incorporated by reference and fully set forth.

What is claimed is:

1. An automotive body panel product, consisting of:
   a compression molded, fiber-reinforced plastic automotive body panel;
   a cured sealing primer coating on said compression molded, fiber-reinforced plastic a automotive body panel, said cured sealing primer coating including the reaction product of a sealing primer coating composition including a hydroxyl-functionalized polybutadiene polymer having a hydroxyl functionality of approximately 1.5 to approximately 4, a first curing agent, wherein the first curing agent comprises a first aliphatic polyisocyanate based on hexamethylene diisocyanate trimer, a second curing agent, wherein the second curing agent comprises an aliphatic polyisocyanate based on isophorone diisocyanate trimer, a third curing agent, wherein the third curing agent comprises 2,3,6,7-naphthalenetetracarboxylic acid, a fourth curing agent, wherein the fourth curing agent comprises methylbicyclo[2.2.1]hept-5-ene-2,3-dicarboxylic anhydride, and a fifth curing agent, wherein the fifth curing agent comprises a latent boron trichloride chelate, a water scavenger, wherein the water scavenger consists of triethyl orthoformate, and an electrically-conductive pigment which reduces gas or vapor release from said fiber-reinforced plastic automotive body panel upon heating; and
   a heat-cured acrylic and/or polyester powder primer coating atop said cured sealing primer coating, said heat-cured powder primer coating free from vapor boil defects.

2. The automotive body panel product according to claim 1, wherein the electrically-conductive pigment is carbon black and is present in said sealing primer coating composition at a level of about 1% to about 10% by weight, based on the weight of a binder of the sealing primer coating composition.

3. The automotive body panel product according to claim 2, wherein the cured sealing primer coating provides a surface conductivity of at least about 100 Randsburg units.

4. The automotive body panel product according to claim 3, wherein said hydroxyl-functionalized polybutadiene polymer comprises a number-average molecular weight in a range of about 1,000 to about 5,000.

5. The automotive body panel product according to claim 4, wherein said hydroxyl-functionalized polybutadiene polymer is present in the sealing primer coating composition in an amount ranging from 0.01 to 90 weight percent based on total weight of the sealing primer coating composition.

6. The automotive body panel product according to claim 5, wherein said a sealing primer coating composition further comprises a sixth curing agent consisting of an aminoplast resin.

7. The automotive body panel product according to claim 5, wherein the first and second curing agents are collectively present in said sealing primer coating composition in an amount ranging from about 1 to about 40 weight percent based on the weight of the hydroxyl-functionalized polybutadiene polymer.

8. The automotive body panel product according to claim 7, wherein said sealing primer coating composition contains about 0.01%-3% by weight, based on the weight of a binder of the sealing primer coating composition, of an ultraviolet light stabilizer.

9. The automotive body panel product according to claim 8, wherein said sealing primer coating composition contains about 0.01% to about 3% by weight, based on the weight of a binder of the sealing primer coating composition, of an ultraviolet absorber.

10. The automotive body panel product according to claim 9, wherein said sealing primer coating composition contains about 0.01% to about 3% by weight, based on the weight of a binder of the sealing primer coating composition, of an ultraviolet light stabilizer and about 0.01% to about 3% by weight, based on the weight of the binder, of an ultraviolet absorber.

11. The automotive body panel product according to claim 10, wherein the sealing primer coating composition comprises at least one catalyst.

12. The automotive body panel product according to claim 11, wherein the at least one catalyst consists of dibutyltin dilaurate.

13. The automotive body panel product according to claim 12, wherein the sealing primer coating composition comprises a volatile content in the range of 0% to about 95% by weight based on the total weight of the sealing primer coating composition.

14. The automotive body panel product according to claim 13, wherein the sealing primer coating composition includes one or more volatile components selected from the group consisting of water, alcohols, esters, ketones, glycol ethers, hydrocarbon fractions, and terpenes.

15. The automotive body panel product according to claim 14, wherein the sealing primer coating composition includes one or more volatile components selected from the group consisting of xylene, methyl ethyl ketone, butyl acetate, methyl amyl ketone, and mineral spirits.

* * * * *